(12) United States Patent
Acharya et al.

(10) Patent No.: US 11,393,454 B1
(45) Date of Patent: Jul. 19, 2022

(54) GOAL-ORIENTED DIALOG GENERATION USING DIALOG TEMPLATE, API, AND ENTITY DATA

(71) Applicant: Amazon Technologies, Inc., Seattle, WA (US)

(72) Inventors: Anish Acharya, Santa Clara, CA (US); Angeliki Metallinou, Mountain View, CA (US); Tagyoung Chung, Sunnyvale, CA (US); Shachi Paul, San Jose, CA (US); Shubhra Chandra, San Jose, CA (US); Chien-wei Lin, Sunnyvale, CA (US); Dilek Hakkani-Tur, Los Altos, CA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 16/219,484

(22) Filed: Dec. 13, 2018

(51) Int. Cl.
*G10L 15/06* (2013.01)
*G10L 15/18* (2013.01)
*G10L 15/22* (2006.01)
*G06F 9/54* (2006.01)

(52) U.S. Cl.
CPC ............. *G10L 15/063* (2013.01); *G06F 9/54* (2013.01); *G10L 15/18* (2013.01); *G10L 2015/0631* (2013.01)

(58) Field of Classification Search
CPC .......... G10L 15/18; G10L 15/063; G10L 2015/0631; G10L 2015/0638; G10L 15/22; G10L 2015/223; G06Q 30/02

USPC .......................... 704/243, 270, 277
See application file for complete search history.

(56) References Cited

U.S. PATENT DOCUMENTS

| | | | |
|---|---|---|---|
| 2005/0033582 A1* | 2/2005 | Gadd | G06Q 30/02 704/277 |
| 2006/0206332 A1* | 9/2006 | Paek | G10L 13/00 704/257 |
| 2009/0112586 A1* | 4/2009 | Williams | G10L 15/01 704/239 |
| 2009/0306995 A1* | 12/2009 | Weng | G06Q 10/103 705/301 |
| 2010/0063823 A1* | 3/2010 | Wu | G10L 13/00 704/275 |
| 2017/0147554 A1* | 5/2017 | Chen | G06F 3/167 |
| 2017/0330556 A1* | 11/2017 | Fatemi Booshehri | G06N 3/0427 |

(Continued)

OTHER PUBLICATIONS

Crook, Paul A., and Alex Marin. "Sequence to Sequence Modeling for User Simulation in Dialog Systems." INTERSPEECH. Aug. 2017, pp. 1706-1710. (Year: 2017).*

(Continued)

*Primary Examiner* — Farzad Kazeminezhad
(74) *Attorney, Agent, or Firm* — Pierce Atwood LLP

(57) ABSTRACT

A dialog generator receives data corresponding to desired dialog, such as application programming interface (API) information and sample dialog. A first model corresponding to an agent simulator and a second model corresponding to a user simulator take turns creating a plurality of dialog outlines of the desired dialog. The dialog generator may determine that one or more additional APIs are relevant to the dialog and may create further dialog outlines related thereto. The dialog outlines are converted to natural dialog to generate the dialog.

23 Claims, 12 Drawing Sheets

(56) References Cited

U.S. PATENT DOCUMENTS

| | | | |
|---|---|---|---|
| 2017/0337478 A1* | 11/2017 | Sarikaya | G10L 15/22 |
| 2018/0226076 A1* | 8/2018 | Kotti | G10L 15/22 |
| 2018/0232435 A1* | 8/2018 | Papangelis | G06F 16/3329 |
| 2018/0233143 A1* | 8/2018 | Papangelis | G06F 40/20 |
| 2020/0152184 A1* | 5/2020 | Steedman Henderson | G06N 3/08 |
| 2020/0160842 A1* | 5/2020 | Lin | G10L 15/063 |

OTHER PUBLICATIONS

Shah, Pararth, et al. "Building a conversational agent overnight with dialogue self-play." arXiv preprint arXiv:1801.04871, Jan. 2018. pp. 1-11. (Year: 2018).*

* cited by examiner

GOAL-ORIENTED DIALOG GENERATION USING DIALOG TEMPLATE, API, AND ENTITY DATA

BACKGROUND

Speech-recognition systems have progressed to a point at which human users are able to control computing devices using their voices. These systems employ techniques to identify words spoken by the user based on the various qualities of a received audio input. Speech-recognition processing combined with natural-language understanding processing enables voice-based control of a computing device to perform tasks based on the user's spoken commands. The combination of speech-recognition processing and natural-language understanding processing is referred to herein as speech processing. Speech processing may also involve converting a user's speech into text data, which may then be provided to other applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
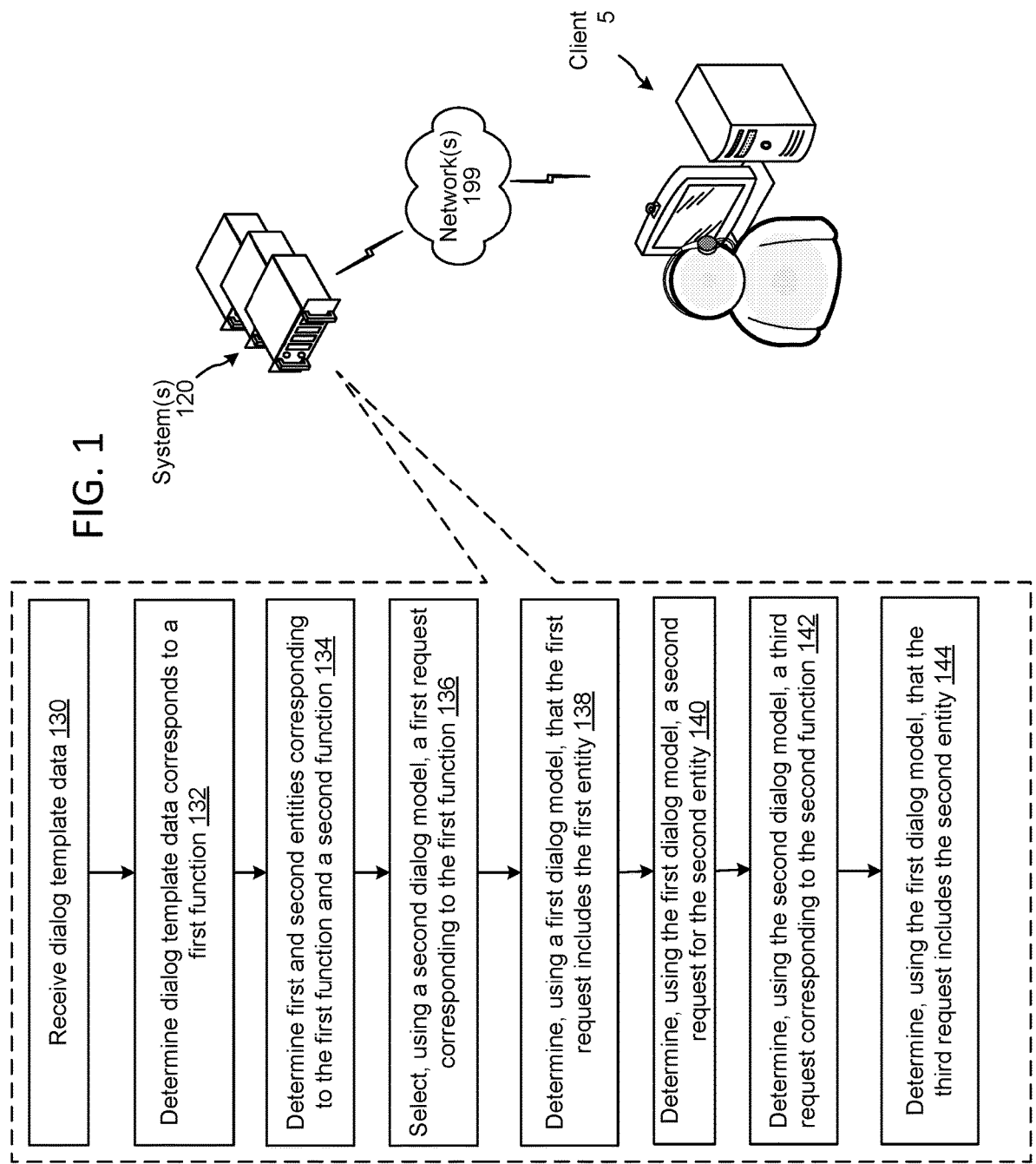
FIG. 1 illustrates a flow diagram for generating goal-oriented dialog according to embodiments of the present disclosure.

Dialog processing, as used herein, that involves communication between a computing system and a human via text, audio, and/or other forms of communication. A dialog may include a multi-turn exchange between a system and a user, where each input and response pair may be considered a "turn" (for example a user input to the system and the system's response to that input may be one turn). Thus, while some dialog processing involves only simple generation of a response given only a most recent input from a user (i.e., single-turn dialog), more complicated dialog processing involves determining and optionally acting on one or more goals expressed by the user, such as making a restaurant reservation and/or booking an airline ticket. These multi-turn "goal-oriented" dialog systems typically need to recognize, retain, and use information collected during more than one input during a back-and-forth or "multi-turn" exchange with the user. In some goal-oriented dialog sessions, the system can select a particular application to act on an expressed goal, but the user may express (or the system may determine) a second goal that cannot be acted upon using the selected application.

In one example interaction with a dialog system, shown below in Table 1, a user interacts with the dialog system. The user expresses a desire to take a spouse out for their anniversary. Though the system identifies an event in a specified area, the system did not understand that the user wished for an appropriately romantic event, and instead suggested an action movie. The user then asks for a restaurant; the system did not understand that the user wished the same location and, further, did not understand the romantic intent and suggests fast food-restaurants.

TABLE 1

Sample Dialog

| Turn Number | User Input | System Output |
|---|---|---|
| 1 | "Hi." | "Hello, what can I help you with today?" |
| 2 | "Where should I take my spouse tonight? It's our anniversary." | "What is your ZIP code?" |
| 3 | "12345" | [API: movies] "There is a cinema there showing two action movies; one at 9 PM and one at 10 PM. Which one would you like to go to?" |
| 4 | "No, thank you. How about a restaurant?" | "Near where?" |
| 5 | "12345" | [API: food] "There are two fast-food restaurants there. Which one would you like?" |
| 6 | "No, thanks." | |

A dialog system may include an automatic speech recognition (ASR) system and/or a natural-language understanding (NLU) component to map input dialog text into a digital representation, such as a vector. The dialog system may further include a text-to-speech system (TTS) for outputting audio. The systems may be trained using training data individually, in groups, or together.

Described herein is a system and method for dialog generation that enables training of a speech system to understand multiple goals expressed by a user and to act on those goals. In various embodiments, a client provides dialog template information, such as application-programming interface (API) information related to a goal, entities required to make an API call (i.e., request that the API execute a function associated with the API), and/or a small amount of sample dialog (e.g., five interactions between a user and a dialog agent). The dialog template data is parsed, and a number of entities required to make the API call is determined. An agent simulator (e.g., a dialog agent chatbot) generates agent dialog outline data corresponding to a dialog agent; the agent dialog outline data may include requests for one or more entities. A user simulator (e.g., a user chatbot) generates replies to the requests in the agent dialog outline data. An entity fulfiller may keep track of which entities are still required and which entities have been fulfilled, and inform the agent simulator of the required entities. A dialog outline generator may create the dialog outline using the outputs of the agent simulator, user simulator, and/or user and/or agent natural language generators. A natural language component may be used to create dialog from the dialog outline. The dialog may include hundreds, thousands, or more examples of interactions between a user and the dialog agent and may be used to train a multi-goal dialog system.

In an example interaction with the dialog system, shown below in Table 2, the system is trained to understand different goals of the user. The system understands that the user wishes a romantic event and searches for one. The system suggest an appropriate restaurant and further asks about transportation.

TABLE 2

Sample Dialog

| Turn Number | User Input | System Output |
|---|---|---|
| 1 | "Hi." | "Hello, what can I help you with today?" |
| 2 | "Where should I take my spouse tonight? It's our anniversary." | "What is your ZIP code?" |
| 3 | "12345" | [API: movies, food] "There are no suitable movies showing near there. How about dinner at a romantic restaurant?" |
| 4 | "Yes." | [API: food] "There is a bistro there with an opening at 7." |
| 5 | "OK." | [API: transit] "Would you also like to call a taxi?" |
| 6 | "No, thanks." | |

FIG. 1 shows a system 120 configured to perform dialog processing according to embodiments of the disclosure. Although FIG. 1 (and other figures and discussion herein) illustrate the operation of the system in a particular configuration and order, the steps described herein may be performed in a different order (and certain steps may be removed or added) without departing from the intent of the disclosure. Although the system 120 is depicted in FIG. 1 as a single element, the system 120 may be one or more devices.

A client 5 may communicate with the system 120 via a network 199. The client 5 may be, for example, a personal computer, smartphone, tablet, network-connected loudspeaker, automobile, home appliance, or any other device. The system 120 may communicate with the client 5 using a text-entry device, such as a keyboard or touchscreen, using an audio-capture device, such as a microphone, using an image-capture device, such as a camera or video camera, or any other such communication device or system. The client 5 may include an output device, such as a screen, touchscreen, loudspeaker, haptic-feedback device, etc., for relaying communications from the system 120. The network 199 may include the Internet and/or any other wide- or local-area network, and may include wired, wireless, and/or cellular network hardware.

In various embodiments, the system 120 receives (130) dialog template information (such as information regarding an application-programming interface (API) associated with the dialog). The system 120 may also receive a first trained dialog model and a second trained dialog model. The first trained dialog model may be trained to generate first text data corresponding to a prompt for information (i.e., the first trained dialog model may be an agent simulator. The second trained dialog model may be trained to generate second text data corresponding to the information (i.e., the second trained dialog model may be a user simulator). The system 120 determines (132) that the dialog template data corresponds to a first function (i.e., a first API call) and determines (134) a first entity and a second entity (i.e., API parameters) corresponding to the first function and to a second function. The system 120 generated dialog data by selecting (136), using the second trained dialog model, a first request corresponding to the first function and determines (138), using the second trained dialog model, that the first request includes the first entity. The system determines (140), using the first trained dialog model, a second request for the second entity and determines (142), using the second model, a third request corresponding to the first function. The system 120 determines (144), using the second trained dialog model, that the third request includes the second entity.

Figure 2:
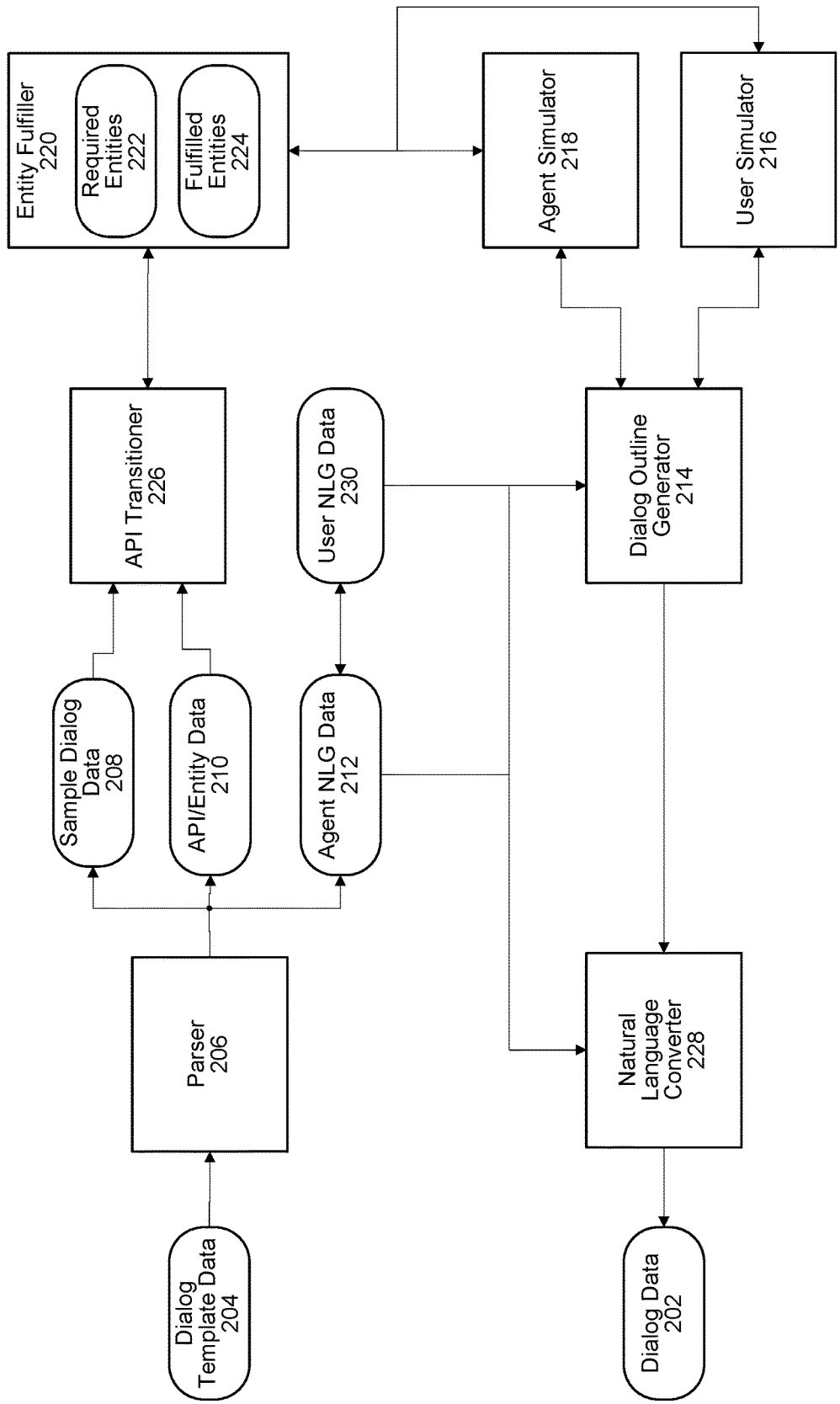
FIG. 2 illustrates a system for generating goal-oriented dialog according to embodiments of the present disclosure.

FIG. 2 is an illustrative block diagram of a dialog generation system according to embodiments of the present disclosure; the system generates dialog data 202 based on input dialog template data 204. As explained here, the dialog data 202 may be text data that includes back-and-forth goal-oriented dialog examples between a user and a dialog agent, and may include hundreds, thousands, or more such interactions related to one or more goals of the user. The dialog template data 204 may include a small number (e.g., five) of sample dialogs, information related to one or more APIs and associated entities, and/or information related to desired natural language generation of a dialog agent (e.g., gender, tone, and/or level of formality). The dialog template data 204 may include markup language or other metadata to indicate the APIs, entities, and natural language generation information. The dialog template data 204 may be formatted in accordance with a template standard, such as one that includes standardized headers. The dialog template data 204 may be received from the client 5 and may be created using a software application.

A parser 206 may parse the dialog template data 204 to generate sample dialog data 208, API-to-entity data 210, and/or agent natural language generation data 212. The sample dialog data 208 may include text data representing a dialog between a user and a dialog agent; the text data and represented dialog may be specific to a particular application or skill and may include a goal associated with the application or skill. For example, if the dialog data 202 is to be used to train a restaurant reservation skill, the text data may include requests from the dialog agent for a date, time, place, and name of a restaurant and corresponding replies from a user.

The API-to-entity data 210 may include a list of one or more APIs; the API-to-entity data 210 may further include a list of entities required to make each API call. The entities associated with each API may be required entities or optional entities. For example, if an API is associated with booking a restaurant reservation, the associated entities may be a time, date, location, and number of people associated with the reservation. Optional entities may include, for example, a desired table in the restaurant or service from a desired waiter. More than one API call may be associated with a given goal. For example, the API-to-entity data 210 may further include an API call for checking the status of a restaurant reservation and an API call for cancelling the restaurant reservation. The API-to-entity data 210 may further include API calls associated with other goals; these other goals may be related to the first goal and/or each other. For example, the API-to-entity data 210 may include an API for finding a parking spot and associated entities (e.g., address, time, and duration). As explained in greater detail below, the system may generate dialog related to these other API if and when it determines that a user may desire fulfillment of goals associated therewith.

The agent natural language generation data 212 may include sounds, words, phrases, or other text data associated with generation of language associated with the dialog agent. The agent natural language generation data 212 may include, for example, proper names associated with the API or entities and pronunciations thereof, names of providers of goods or services associated with the APIs, or other similar information.

A dialog outline generator 214 generates a dialog outline for one or more goal-based interactions between a dialog agent and a user. In various embodiments, the dialog outline generator 214 instructs a user simulator 216 to generate a first item of the dialog outline. This first item of the dialog outline may represent an initial request or command from a user. For example, the first item of the dialog outline may be <request restaurant reservation>, which may correspond to a first item of actual dialog "I'd like to make a restaurant reservation." The user simulator 216 may generate the first item of the dialog outline by selecting from a list of pregenerated first items of the dialog outline; this selection may be made in list order or randomly selected from the list. In some embodiments, the user simulator 216 generates this list of pregenerated first items based at least in part on the sample dialog data 208 and/or the dialog agent natural language generation data 212.

The dialog outline generator 214 adds this first item of the dialog outline to the dialog outline. The dialog outline generator 214 may then send data representing the first item of the dialog outline to an agent simulator 218. The agent simulator 218 may then generate a second item of the dialog outline based on the first item of the dialog outline. As explained in greater detail below, the user simulator 216 and/or agent simulator 218 may be trained models that process input text using the model and generate output text based thereon. The user simulator 216 and/or agent simulator 218 may, for example, include seq2seq models that encode the input text into a vector and decode the vector to produce output text and may be built using, for example LSTM cells.

The agent simulator 218 may determine that one or more entities related to an API are represented in the first item of the dialog outline. An entity fulfiller 220 may be used to track which entities have been provided by the user simulator 216 (i.e., fulfilled) and which entities still require fulfillment. The entity fulfiller 220 may thus maintain a first list of required entities 222 for a given API and a second list of fulfilled entities 224 for the given API. When the agent simulator 218 and/or entity fulfiller 220 determines that a required entity is present in the first item of the dialog outline, it moves the entity from the list of required entities 222 to the list of fulfilled entities 224. The user simulator 216 may, instead or in addition, read or modify the list of required entities 222 and/or fulfilled entities 224. The user simulator 216 may, for example, provide entity information in response to a request for one or more entities from the agent simulator 218 based at least in part on previously supplied entities by reading from the list of fulfilled entities 224.

The agent simulator 218 may determine the second item of the dialog outline based at least in part on the list of required entities 222 and/or the list of fulfilled entities 224. If an entity is present in the list of required entities 222, the agent simulator 218 may include a request for the entity in the second item of the dialog outline. If more than one entity is present in the list of required entities 222, the agent simulator 218 may include multiple requests for the more than one entity in the second item of the dialog outline.

The user simulator 216 and the agent simulator 218 continue to generate items of the dialog outline in turn, as coordinated by the dialog outline generator 214. The agent simulator 218 continues to generate items of the dialog outline that include requests for the required entities 222 until all the entities are present in the fulfilled entities 224. In some embodiments, the agent simulator 218 stops generating items of the dialog outline if a predetermined number of items of the dialog outline have already been generated or if an item generated by the user simulator 216 includes a request or command to cease the dialog.

In some embodiments, the dialog outline generator 214 creates a plurality of dialog outlines. The agent simulator 218 may create variations in the dialog outlines by changing an order of requests for the entities in each dialog outline. For example, a first dialog outline may first include a request for a name of a restaurant and then a time of the reservation; a second dialog outline may first include the request for the time and then the name. The agent simulator 218 may further create variations in the dialog outlines by including requests for entities using different words or categories. For example, a first dialog outline may include a request for a desired type of cuisine of the restaurant, while a second dialog outline may include a request for a desired location of the restaurant. The agent simulator 218 may instead or in addition create variations in the dialog outlines by generating items of dialog that request a single entity or generating items of dialog that request multiple entities. For example, a first dialog outline may include an item requesting a time and date for the reservation; a second dialog outline may include a first item requesting the time and a second item requesting the date.

The user simulator 216 may also create variations in the dialog outline. The items of the dialog outline generated by the user simulator 216 may be categorized as cooperative, over-cooperative, under-cooperative, non-cooperative, and indecisive. A cooperative item of the dialog outline is one in which the user simulator 216 includes in the item an entity requested by the agent simulator 218 in the previous item. For example, if the agent simulator 218 generates an item requesting a time of the reservation, the user simulator may generate an item providing the time. An over-cooperative item of the dialog outline is one in which the user simulator 216 includes in the item an entity requested by the agent simulator 218 in the previous item as well as one or more additional entities. For example, if the agent simulator 218 generates an item requesting a time of the reservation, the user simulator may generate an item providing the time and the date of the reservation. An under-cooperative item of the dialog outline is one in which the user simulator 216 includes in the item part of an entity requested by the agent simulator 218 in the previous item as well as one or more additional entities. For example, if the agent simulator 218 generates an item requesting a time of the reservation, the user simulator may generate an item providing a range of times of the reservation. A non-cooperative item of the dialog outline is one in which the user simulator 216 does not include the entity in the item requested by the agent simulator 218 in the previous item. For example, if the agent simulator 218 generates an item requesting a time of the reservation, the user simulator may generate an item that does not specify a time. An indecisive item of the dialog outline is one in which the user simulator 216 includes in the item a previously-fulfilled entity (i.e., the user changed his or her mind regarding an entity). For example, if the agent simulator 218 generates an item requesting a time of the reservation, the user simulator 216 may generate an item providing time of the reservation but may later generate a different item providing a different time.

The agent simulator 218 may vary its generated items based on the type of the response from the user simulator 216. For example, if the user simulator 216 generates an under-cooperative item, the agent simulator 218 may generate another item of the dialog outline requesting further information regarding the associated entity. If the user simulator 216 generates an indecisive item, the agent simulator 218 may generate another item of the dialog outline requesting confirmation.

The dialog outline generator 214 may, along with the agent simulator 218 and the user simulator 214, generate a fixed number of dialog outlines; for example, 1,000-5,000 dialog outlines. In other embodiments, the dialog outline generator 214 generates a number of dialog outlines corresponding to the number of available permutations of dialog, as discussed above. This number may be represented by a number of possible orders of requesting the entities, a number of combinations of requests for one or for more than one entity, and the number of different types of responses generated by the user simulator. In some embodiments, a number, minimum number, or maximum number of dialog outlines is represented in the dialog template data 204.

In some embodiments, the agent simulator 218 generates items of the dialog outline that relate to more than one API. The agent simulator 218 may determine that a list of entities are fulfilled for a first API and then determine a second list of entities to be fulfilled by a second API. In other embodiments, the agent simulator 218 may partially fulfill a first list of entities for the first API, wholly or partially fulfill the second list of entities for the second API, and then optionally fulfill the first list of entities.

An API transitioner 226 selects an API for which the agent simulator 218 generates an item of the dialog outline requesting a corresponding entity. As explained with greater detail below, the API transitioner 226 may include a state for each API, and the current state represents the currently selected API. The API transitioner 226 may, after each item of the dialog outline generated by the user simulator 216, determine whether to remain in a current state associated with a current API or transition to a second state associated with a second API. The API transitioner 226 may determine to transition to the second API based on a request or other data in the item of the dialog outline associated with the second API and/or based on a relationship between the APIs. For example, the user simulator 216 may generate an first item of the dialog outline relating to a restaurant reservation and a second item of the dialog outline relating to transportation to the restaurant; the API transitioner 226 may, after receiving the second item, transition from a first API associated with the restaurant reservation to a second API associated with the transportation. In other embodiments, the API transitioner 226 positively associates the transportation API with the reservation API such that, when entities associated with the reservation API are fulfilled, the API transitioner 226 transitions to the transportation API.

Once the dialog outline generator 214 generates one or more dialog outlines, a natural language component 228 converts the dialog outline(s) to the dialog data 202 using, for example, the natural language techniques described herein. The natural language component 228 and/or the dialog outline generator 214 may use the agent natural language generation data 212 and/or user natural language generation data 230 to create the dialog data 202 and/or the dialog outline(s). In some embodiments, the dialog data 202 may be instead or in addition created by sending some or all of the dialog outline to one or more remote users (i.e., "crowdsourcing"); the remote users may send some or all of the dialog data 202 to the dialog generator.

Figure 3:
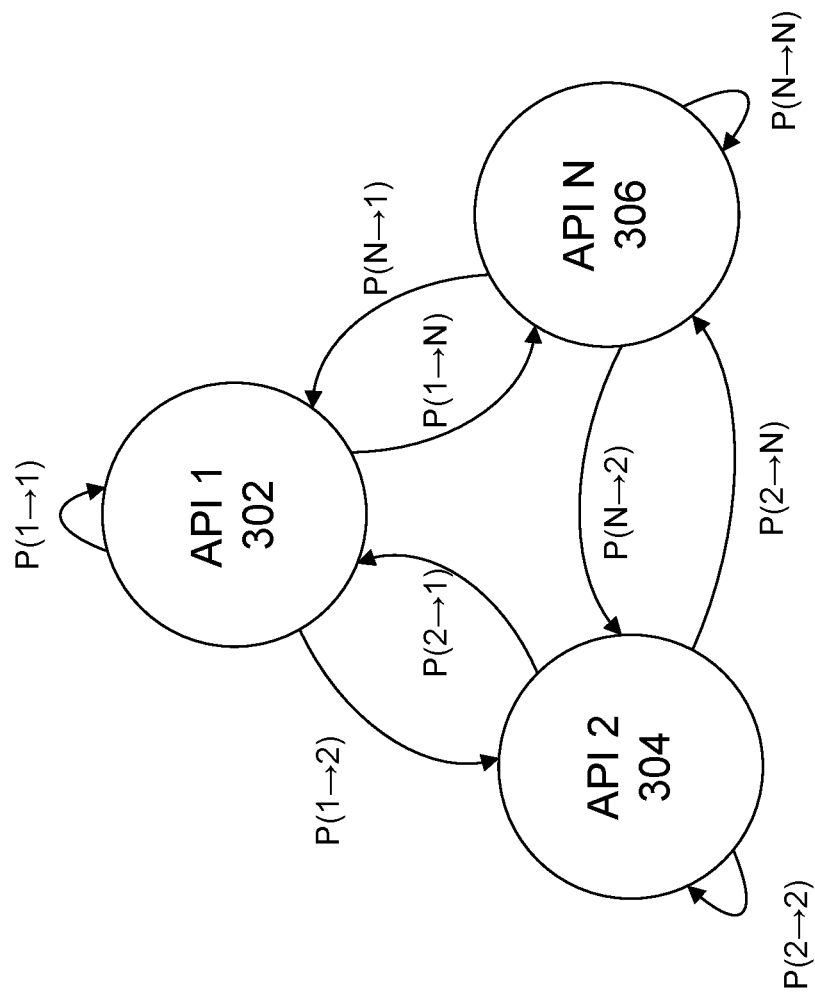
FIG. 3 illustrates a system for transitioning between states according to embodiments of the present disclosure.

FIG. 3 illustrates the API transitioner 226 in accordance with embodiments of the present invention. The API transitioner 226 includes states corresponding to N APIs: API 1 302, API 2 304, ... API N 306. Each state is associated with a first probability, represented by the lines, of remaining in the state (e.g., probability P(1→1) is the probability that the API transitioner 226 will remain in the state associated with API 1. Each state is further associated with an additional (N−1) probabilities of transitioning to a different state. For example, probability P(1→2) is the probability that the API transitioner 226 will transition from the state associated with API 1 to the state associated with API 2. The probabilities may be determined by a number of entities in common between two APIs (i.e., more entities in common produces a greater probability) and/or by an output of one API matching an input of a second API (i.e., a greater match produces a greater probability).

Figure 4:
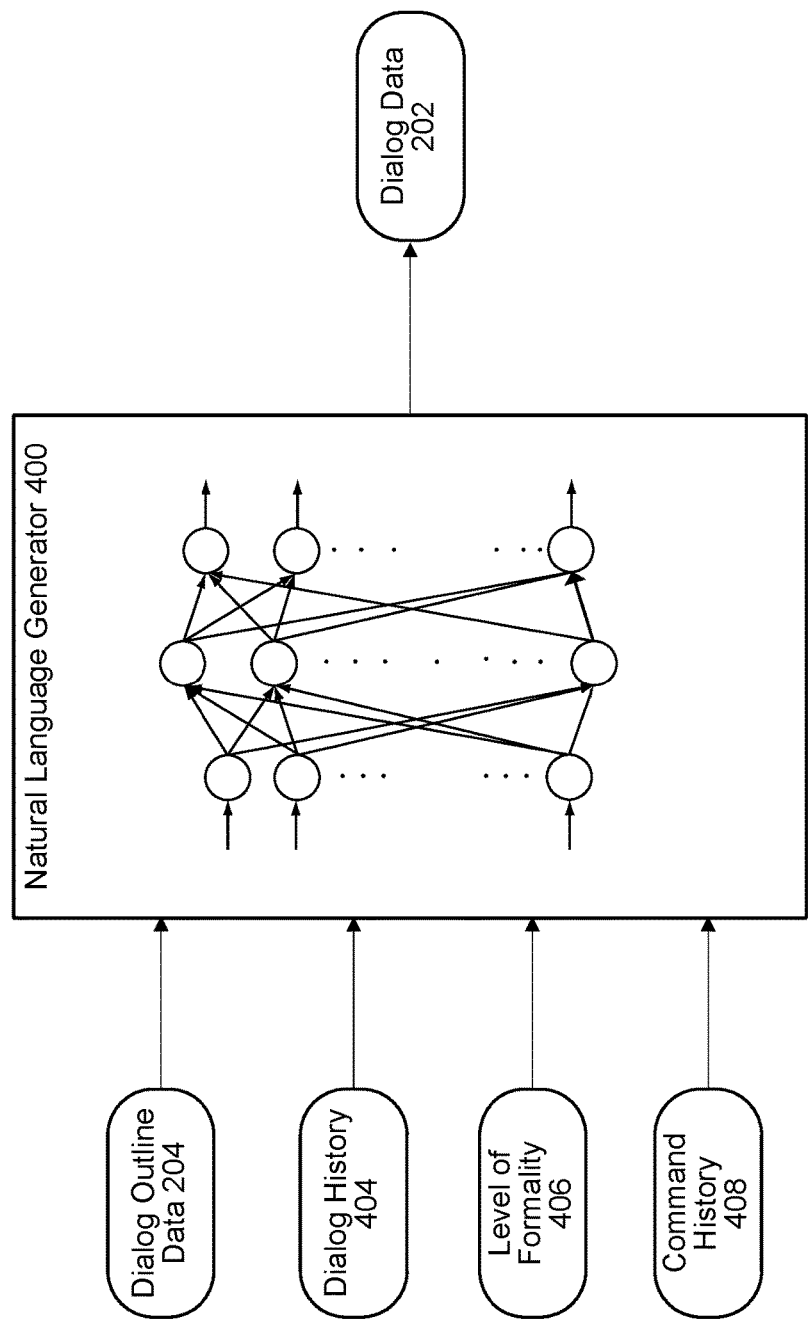
FIG. 4 illustrates a system for generating natural language according to embodiments of the present disclosure.

FIG. 4 is an illustrative block diagram of a natural language generation system according to embodiments of the present disclosure. The natural language generation system may be a trained model, such as a neural network, which is described in greater detail with reference to FIGS. 5 and 6. The natural language generation ("NLG") system, in some embodiments, generates dialog data 202 from dialog outline data 204 such that the dialog data 202 has a natural feel and, in some embodiments, includes words and/or phrases specifically formatted for a requesting application or individual. As opposed to using templates to formulate responses, the NLG system may include models trained from various templates for forming the dialog data 202. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history 404, a level or formality 406, and/or a command history 408.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using a text-to-speech system.

Figure 5:
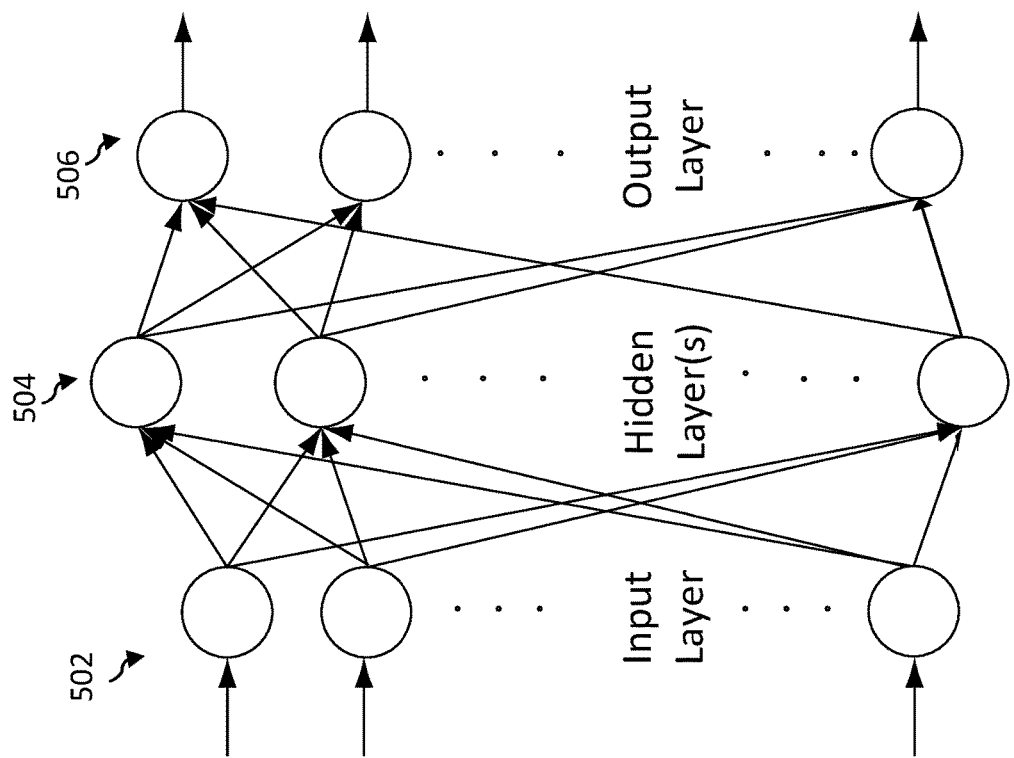
FIG. 5 illustrates a neural network for dialog processing according to embodiments of the present disclosure.

Neural networks may be used to perform dialog processing, including translation-model processing and language-model processing. An example neural network is illustrated in FIG. 5. The neural network may include nodes organized as an input layer 502, a hidden layer 504, and an output layer 506. The input layer 502 may include m nodes, the hidden layer 504 n nodes, and the output layer 506 o nodes, where m, n, and o may be any numbers and may represent the same or different numbers of nodes for each layer. Nodes of the input layer 502 may receive inputs, and nodes of the output layer 506 may produce outputs. Each node of the hidden layer 504 may be connected to one or more nodes in the input layer 502 and one or more nodes in the output layer 504. Although the neural network illustrated in FIG. 5 includes a single hidden layer 504, other neural network may include multiple middle layers 504; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 6:
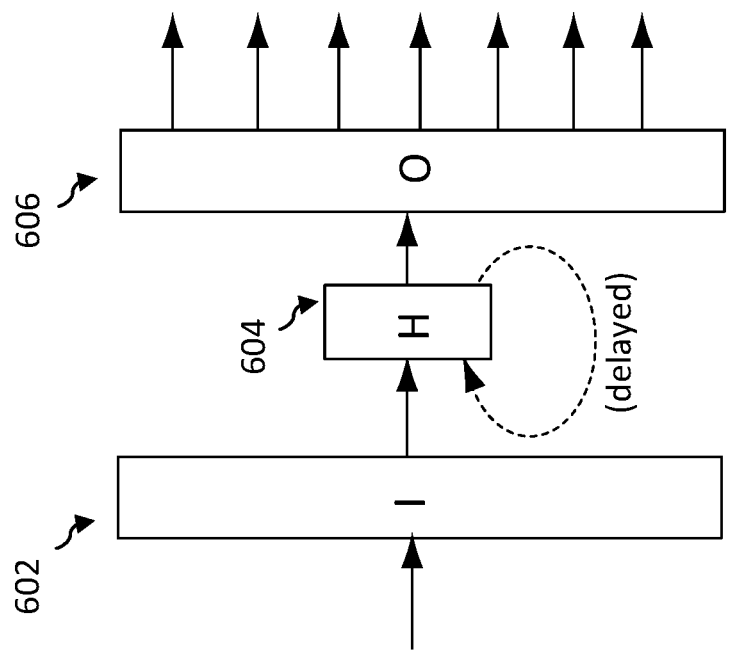
FIG. 6 illustrates a recurrent neural network for dialog processing according to embodiments of the present disclosure.

In one aspect, a neural network is constructed using recurrent connections such that one or more outputs of the hidden layer of the network feeds back into the hidden layer again as a next set of inputs. Such a neural network is illustrated in FIG. 6. Each node of the input layer 602 connects to each node of the hidden layer 604; each node of the hidden layer 604 connects to each node of the output layer 606. As illustrated, one or more outputs 608 of the hidden layer 604 is fed back into the hidden layer 604 for processing of the next set of inputs. A neural network incorporating recurrent connections may be referred to as a recurrent neural network (RNN).

In the case in which a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 6, the prediction of the potential next word may be based on previous words in an utterance and not just on the most recent word. The language model neural network may also output weighted predictions for the next word.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 7:
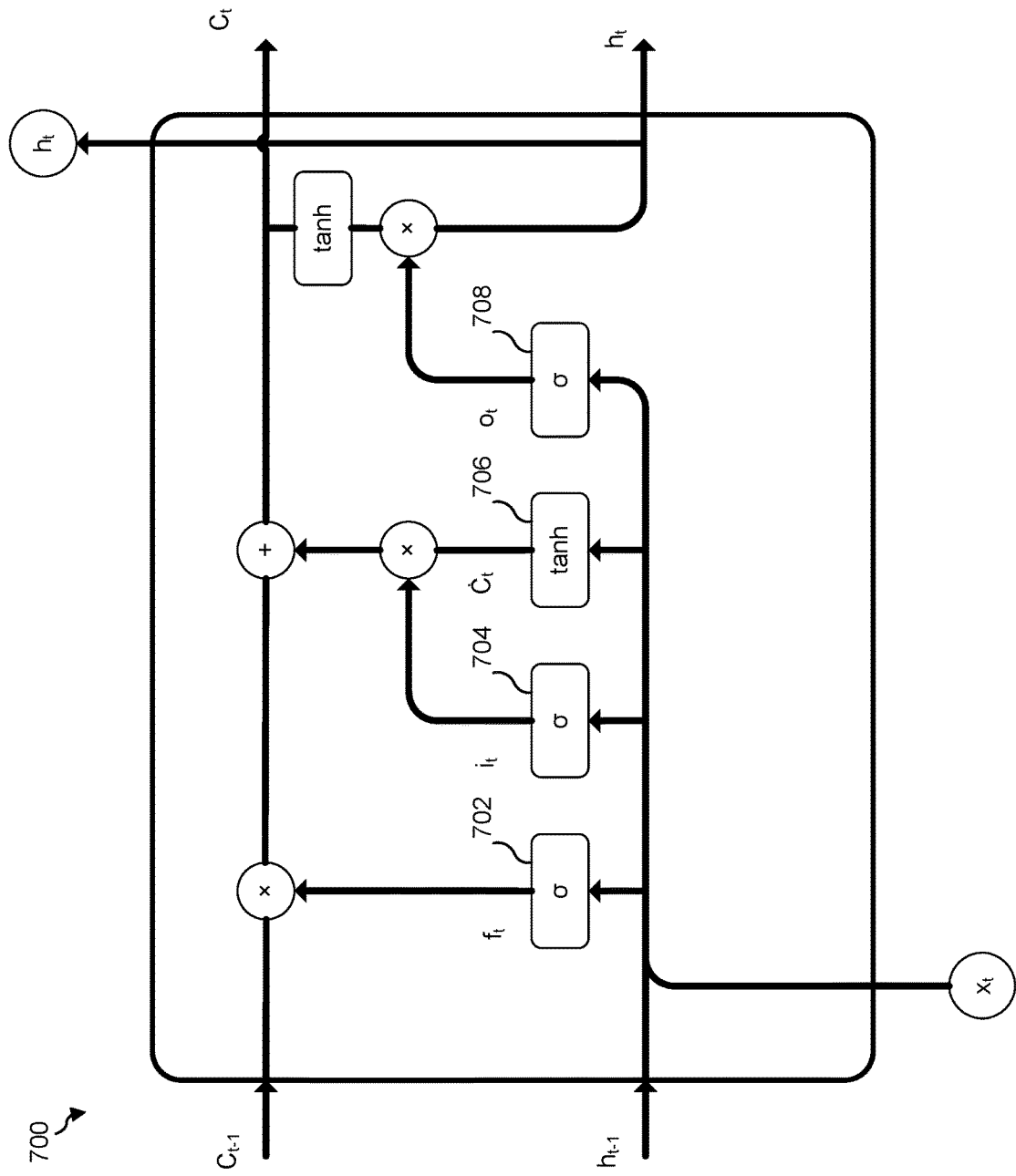
FIG. 7 illustrates a long-short-term memory cell for dialog processing according to embodiments of the present disclosure.

FIG. 7 illustrates an exemplary long short-term memory (LSTM) cell 700 capable of learning long-term dependencies. The LSTM cell 700 may be incorporated in, for example, the encoders 802a, 802b and/or decoders 804a, 804b of FIG. 8. The LSTM cell 700 receives an input vector $x_t$ and generates an output vector $h_t$. If the LSTM cell 700 is part of an encoder or translation model, the input vector $x_t$ corresponds to user input, such as input text data 810 of FIG. 8 or input data 602 of FIG. 6; the output vector $h_t$ corresponds to a context vector, such as the context vector 812 of FIG. 8. If the LSTM cell 700 is part of a decoder or language model, the input vector $x_t$ corresponds to a context vector, such as the context vector 812 of FIG. 8, and the output vector $h_t$ corresponds to dialog output, such as output text data 814a-514b of FIG. 8.

The cell further maintains a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 702, an "input gate" layer 704, a tanh layer 706, and a sigmoid layer 708.

The forget gate layer 702 may be used to remove information from the previous cell state $C_{t-1}$. The forget gate layer 702 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$. The output $f_t$ of the forget gate layer 702 may be defined by the below equation.

$$f_t = \sigma\{W_f \cdot [(h_{t-1}), (x_t)] + b_f\} \quad (1)$$

The input gate layer 704 and the tanh layer 706 may be used to decide what new information should be stored in the cell state $C_{t-1}$. The input gate layer 704 determines which values are to be updated by generating a vector $i_t$ of numbers between 0 and 1 for information that should not and should be updated, respectively. The tanh layer 706 creates a vector $\dot{C}_t$ of new candidate values that might be added to the cell state $C_t$. The vectors $i_t$ and $\dot{C}_t$, defined below, may thereafter be combined and added to the combination of the previous state $C_{t-1}$ and the output $f_t$ of the forget gate layer 702 to create an update to the state $C_t$.

$$i_t = \sigma\{W_i \cdot [(h_{t-1}), (x_t)] + b_i\} \quad (2)$$

$$\dot{C}_t = \tanh\{W_C \cdot [(h_{t-1}), (x_t)] + b_C\} \quad (3)$$

Once the new cell state $C_t$ is determined, the sigmoid layer 708 may be used to select which parts of the cell state $C_t$ should be combined with the input $x_t$ to create the output $h_t$. The output $o_t$ of the sigmoid layer 708 and output $h_t$ may thus be defined by the below equations. These values may be further updated by sending them again through the cell 700 and/or through additional instances of the cell 700.

$$o_t = \sigma\{W_o \cdot [(h_{t-1}), (x_t)] + b_o\} \quad (4)$$

$$h_t = o_t \cdot [\tanh(C_t)] \quad (5)$$

Figure 8:
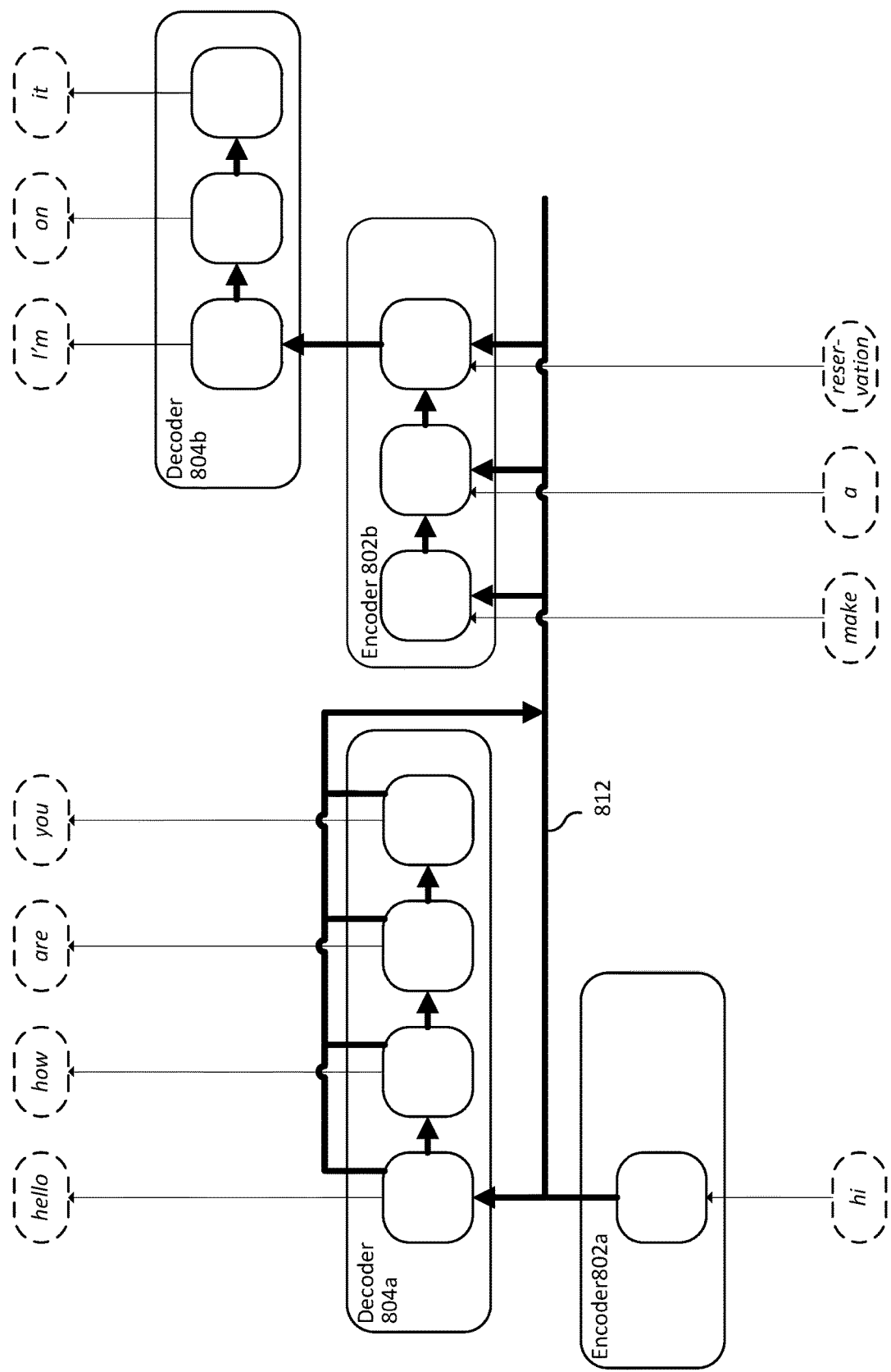
FIG. 8 illustrates a sequence-to-sequence model for processing steps of dialog according to embodiments of the present disclosure.

FIG. 8 illustrates a sequence-to-sequence model 800 that includes encoders 802a, 802b and decoders 804a, 804b. A first turn t−1 of dialog is shown with a second turn t of dialog. The encoder 802a and decoder 804a used in the first turn may be re-used as the encoder 802b and decoder 804b in the second turn; that is, the outputs of the encoder 802a and decoder 804a in the first turn may be fed back to the same encoder 802b and decoder 804b in the second turn. Alternatively, the model 800 may be "unrolled" for each turn and use first instances of encoder 802a and decoder 804a in the first turn and second instances of encoder 802b and decoder 804b in the second turn. Though FIG. 8 illustrates only two turns, any number of turns may be unrolled. In some embodiments, the model 800 is unrolled into a number of instances during training, but fewer instances, including only one copy, are used in operation.

The encoder 802a, 802b and decoder 804a, 804b may be implemented using the LSTM cell 700 of FIG. 7, other types of LSTM cells, other recurrent or convolutional structures, embedding layers, dense layers, or any other such neural-network layers or cells known in the art. In some embodiments, the encoder 802a, 802b includes embedding and LSTM layers, and the decoder 804a, 804b includes dense and LSTM layers. An embedding layer may include a transformer, such as a matrix multiplication, that transforms words into their corresponding vector formats or "embeddings." A dense or "fully connected" layer is a layer in which every input is connected to every output by a weight and which performs an operation on the input to the layer based on the weights. The sequence-to-sequence model 800 may be implemented using any computing language, using hardware and/or software, and on any computing system.

In the case in which the model 800 is not unrolled, the encoder 802a may be used, in a first turn, to encode an input sequence 810 into a first vector 812; this first vector 812 may also or instead be known as a thought vector, context vector, or as any other fixed-dimensional, distributed representation. The first vector 812 may be any single- or multi-dimensional set of values that reflects the words in the input text data. In one embodiment, the first vector 812 is a one-dimensional vector of integers in which a given integer represents a corresponding word in the input sequence; the integer "38573" may represent the word "reservation," for example. The first vector 812 may contain different representations for words, however, and may contain additional information, such as information regarding phrases, proper names, misspellings, number of turns, or any other information in the input text data or elsewhere.

The vector 812 may then be used by the decoder 804a to generate output text data. In a second turn, the encoder 802b receives a second turn of input text data and creates a second vector. The decoder 804b takes the second vector and generates output text data for the second turn. In this simple example, in a first turn 806, a user enters text "hi," and the model 800 responds, "hello, how are you." In a second turn 808, the user enters text "make a reservation," and the model responds, "I'm on it." The response of the model (e.g., the output text data) is determined based on how the model is trained to respond to certain input text data. Possible variations in responses include but are not limited to the number of words of output in each turn, word selection for each position of output, sentence type (e.g., statement or question), or other such variations; the content of the output may include greeting the user, confirming receipt of information, prompting the user for further information, or other such content.

The relationships between the inputs, outputs, and state of the model 800 may be defined by the below equations, in which the input text data is given by $X_t = x_1^t, x_2^t \ldots x_L^t$ in turn t and the output text data to be generated is defined by $Y_t = y_1^t, y_2^t \ldots y_{L'}^t$, in turn t, wherein L is the length of the input text data and L' is the length of the output text data. The encoder 802a, 802b determines $x_k^t$ from the raw input word at position k; in some embodiments, the encoder 802a, 802b includes an embedding layer to perform this function. A cell state vector $C_t = c_1^t, c_2^t \ldots c_L^t$ denotes the cell state vector at word position k in turn t.

$$i_{k,enc}^t = \sigma\{W_{i,enc} \cdot [(h_{k-1,enc}^t),(x_k^t),(h_{L',dec}^{t-1}),(h_{L,enc}^{t-1})] + b_{i,enc}\} \quad (6)$$

$$f_{k,enc}^t = \sigma\{W_{f,enc} \cdot [(h_{k-1,enc}^t),(x_k^t),(h_{L',dec}^{t-1}),(h_{L,enc}^{t-1})] + b_{f,enc}\} \quad (7)$$

$$o_{k,enc}^t = \sigma\{W_{o,enc} \cdot [(h_{k-1,enc}^t),(x_k^t),(h_{L',dec}^{t-1}),(h_{L,enc}^{t-1})] + b_{o,enc}\} \quad (8)$$

$$\tilde{C}_{k,enc}^t = \tanh\{W_{C,enc} \cdot [(h_{k-1,enc}^t),(x_k^t),(h_{L',dec}^{t-1}),(h_{L,enc}^{t-1})] + b_{C,enc}\} \quad (9)$$

$$c_{k,enc}^t = f_{k,enc}^t \cdot c_{k-1,enc}^t + i_{k,enc}^t \cdot \tilde{C}_{k,enc}^t \quad (10)$$

$$h_{k,enc}^t = o_{k,enc}^t \cdot \tanh(c_k, enc) \quad (11)$$

In some embodiments, as shown in FIG. 8, the model 800 is unrolled and the output of the encoder 802a and/or the output of the decoder 804a in the first turn 806 are appended to the input of the encoder 802b in a subsequent turn (in contrast to the embodiment described above). The output of each cell in the decoder, $h_t$, may thus computed as shown by the below equations.

$$i_{k,dec}^t = \sigma\{W_{i,dec} \cdot [(h_{k-1,dec}^t),(h_{L,enc}^t)] + b_{i,dec}\} \quad (12)$$

$$f_{k,dec}^t = \sigma\{W_{f,dec} \cdot [(h_{k-1,dec}^t),(h_{L,enc}^t)] + b_{f,dec}\} \quad (13)$$

$$o_{k,dec}^t = \sigma\{W_{o,dec} \cdot [(h_{k-1,dec}^t),(h_{L,enc}^t)] + b_{o,dec}\} \quad (14)$$

$$\tilde{C}_{k,dec}^t = \tanh\{W_{C,dec} \cdot [(h_{k-1,dec}^t),(h_{L,enc}^t)] + b_{C,dec}\} \quad (15)$$

$$c_{k,dec}^t = f_{k,dec}^t \cdot c_{k-1,dec}^t + i_{k,dec}^t \cdot \tilde{C}_{k,dec}^t \quad (16)$$

$$h_{k,dec}^t = o_{k,dec}^t \cdot \tanh(c_k, dec) \quad (17)$$

Figure 9:
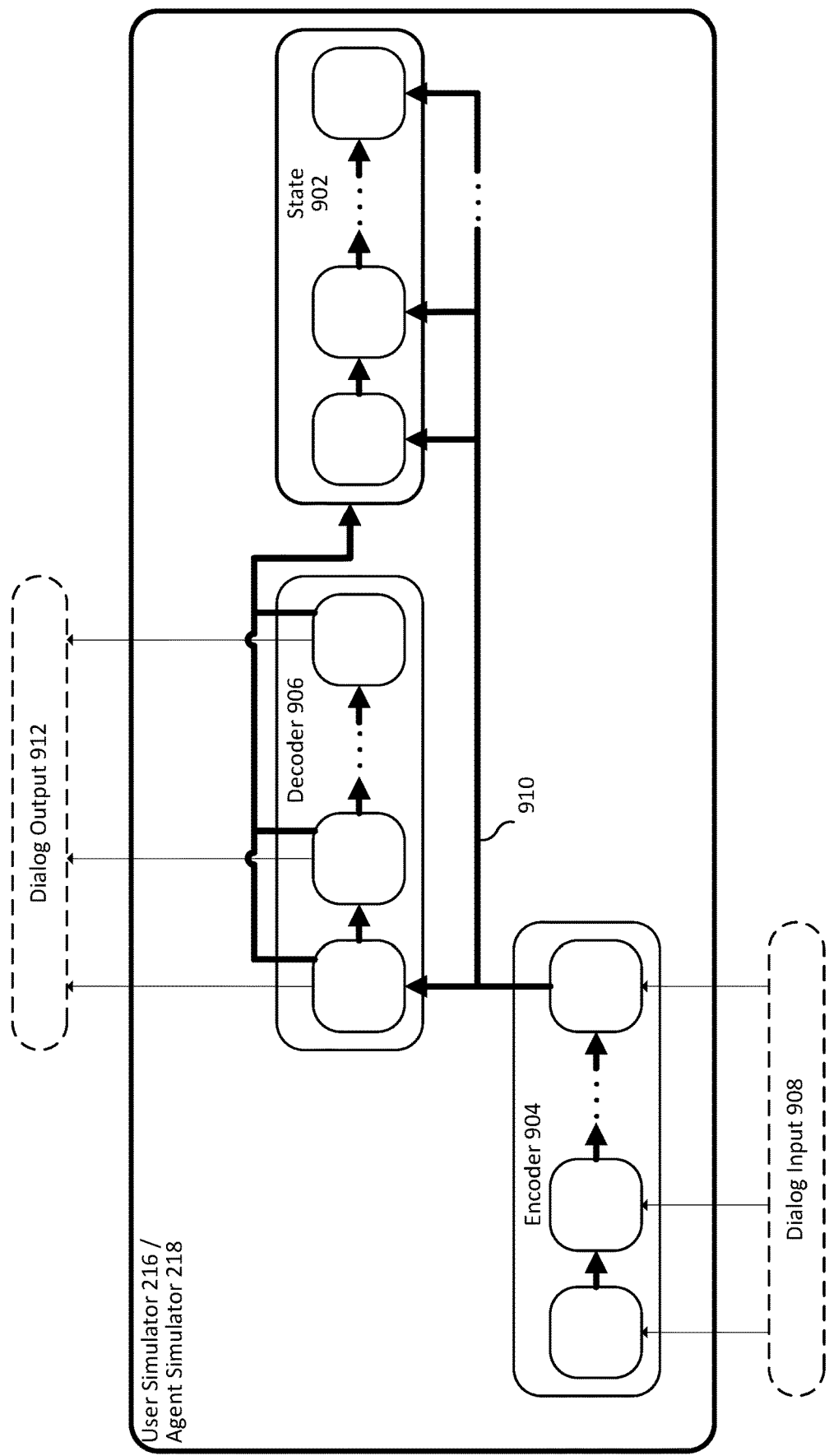
FIG. 9 illustrates a translation/language model for dialog processing according to embodiments of the present disclosure.

FIG. 9 illustrates a trained dialog model 900, which may be the user simulator 200 and/or agent simulator 200 and may have a state tracker 902. The state tracker 902 may be used instead of or in addition to other elements of the present disclosure. The dialog model 900 includes features discussed elsewhere in the present disclosure, such as an encoder 904 and a decoder 906; the encoder 904 may be used to encode dialog input 908 into a context vector 910, and the decoder 906 may be used to generate dialog output data 912 given the context vector 910.

As shown in FIG. 9, the state tracker 902 receives the context vector 910 and the output of the decoder 906; the state tracker 902 may include LSTM cells, such as LSTM cell 400. The state tracker 902 may be used to store possible belief states at each turn of dialog; a belief state may be used to store a value for a particular type, category, or aspect of information to be used in the instruction data, and a word may be stored in a corresponding belief state when it appears in the input data. In other words, in contrast to a trained model which is trained to compute candidate probabilities for output data, one or more belief states may be explicitly hand-designed to store information known to be important instruction data. For example, if the state tracker 902 is to be used to make restaurant reservations, its belief states might be preprogrammed to include "cuisine," "place," "number of diners," and "price range." If, during runtime, the input data 908 includes the text "Please make a reservation for four for Italian food," the state tracker 902 assigns "Italian" to the cuisine state and "four" to the number-of-diners state. Once a minimum number of belief states are assigned, the decoder 906 may include one or more words stored in the belief states in the instruction data as part of a request to an application (via, e.g., an API call) in accordance with a goal expressed in the input data 908. The number of belief states of the state tracker 902 may vary; there may be many belief states—one for each word in the vocabulary used by the model 900—or a few belief states selected specifically for a particular application. If there are many belief states, handcrafted rules may be used during training to extract the belief state information.

Other training techniques may be used with the model 900 or other dialog systems described in the present disclosure. The model 900 may be penalized when, for example, it selects an erroneous parameter for an API call. In a typical dialog session in a training corpus, a user and dialog system go through a number of turns of dialog before the dialog system learns the necessary information to make the request to the third-party device via the API. In some embodiments, however, the model 900 is trained at each step of dialog with the final API call information, even if that information was unknown at that step of dialog. In other embodiments, if the user changes an earlier choice at a step in the dialog, the model is first trained with the API call information until the change occurs, then trained with the final API call information.

The model(s) discussed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component may require establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
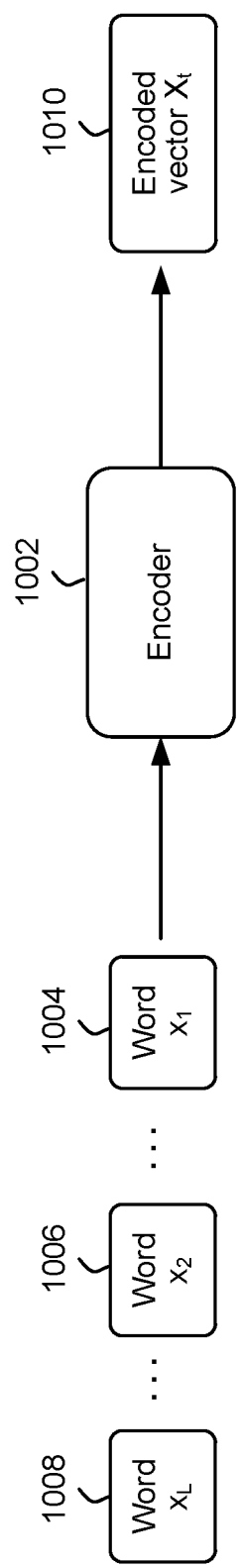
FIG. 10 illustrates operation of an encoder according to embodiments of the present disclosure.

FIG. 10 illustrates an encoder 1002. An input word sequence, starting with words $x_1$ 904 and $x_2$ 906 and continuing through words $x_L$ 908, is input into the encoder 1002; L is the length of the input word sequence in a given dialog turn. Given the input sequence 1004, 1006, 1008, the encoder 1002 projects this sequence to $X_t$ 1010, with $X_t$ being an F-dimensional vector. F may be a fixed length of the vector and may be configurable depending on the configuration of a particular dialog system. The value of F may be, for example, between 1 and 100, but any value may be used. The encoder 1002 may be configured to output vectors $X_t$ having the same size regardless of the size L of the input word sequence in a given turn, thus ensuring a continuity of output vector size. The output vector $X_t$ may also be referred to as an embedding of the sequence $x_1$, $x_2$, ... $x_L$. The encoder 1002 may be implemented as a recurrent neural network (RNN) using, for example, LSTM cells, and may further use dense layers, embedding layers, or any other such layers.

Figure 11:
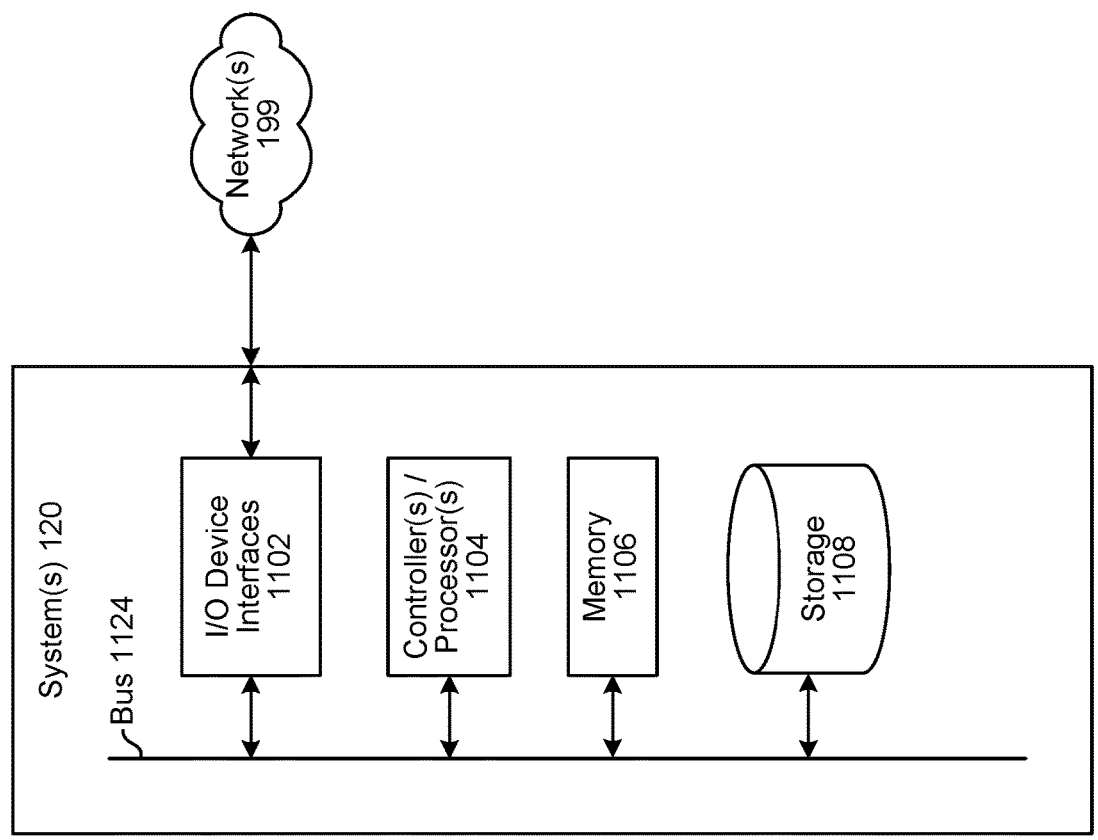
FIG. 11 is a block diagram conceptually illustrating example components of a server according to embodiments of the present disclosure.

FIG. 11 is a block diagram conceptually illustrating example components of a remote device, such as the system(s) 120, which may assist with ASR processing, NLU processing, etc., and a skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (120/225) may include one or more controllers/processors (1104), which may each include a central processing unit (CPU) for processing data and computer-readable instructions, and a memory (1106) for storing data and instructions of the respective device. The memories (1106) may individually include volatile random access memory (RAM), non-volatile read only memory (ROM), non-volatile magnetoresistive memory (MRAM), and/or other types of memory. Each device (120/225) may also include a data storage component (1108) for storing data and controller/processor-executable instructions. Each data storage component (1108) may individually include one or more non-volatile storage types such as magnetic storage, optical storage, solid-state storage, etc. Each device (120/225) may also be connected to removable or external non-volatile memory and/or storage (such as a removable memory card, memory key drive, networked storage, etc.) through respective input/output device interfaces (1102).

Computer instructions for operating each device (120/225) and its various components may be executed by the respective device's controller(s)/processor(s) (1104), using the memory (1106) as temporary "working" storage at runtime. A device's computer instructions may be stored in a non-transitory manner in non-volatile memory (1106), storage (1108), or an external device(s). Alternatively, some or all of the executable instructions may be embedded in hardware or firmware on the respective device in addition to or instead of software.

Each device (120/225) includes input/output device interfaces (1102). A variety of components may be connected through the input/output device interfaces (1102), as will be discussed further below. Additionally, each device (120/225) may include an address/data bus (1124) for conveying data among components of the respective device. Each component within a device (120/225) may also be directly connected to other components in addition to (or instead of) being connected to other components across the bus (1124).

Through the network(s) 199, the system may be distributed across a networked environment. The I/O device interfaces (1102) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1102), processor(s) (1104), memory (1106), and/or storage (1108) of the system(s) 120 or the skill system(s) 225, respectively. Components, such as an ASR component may have its own I/O device interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 12:
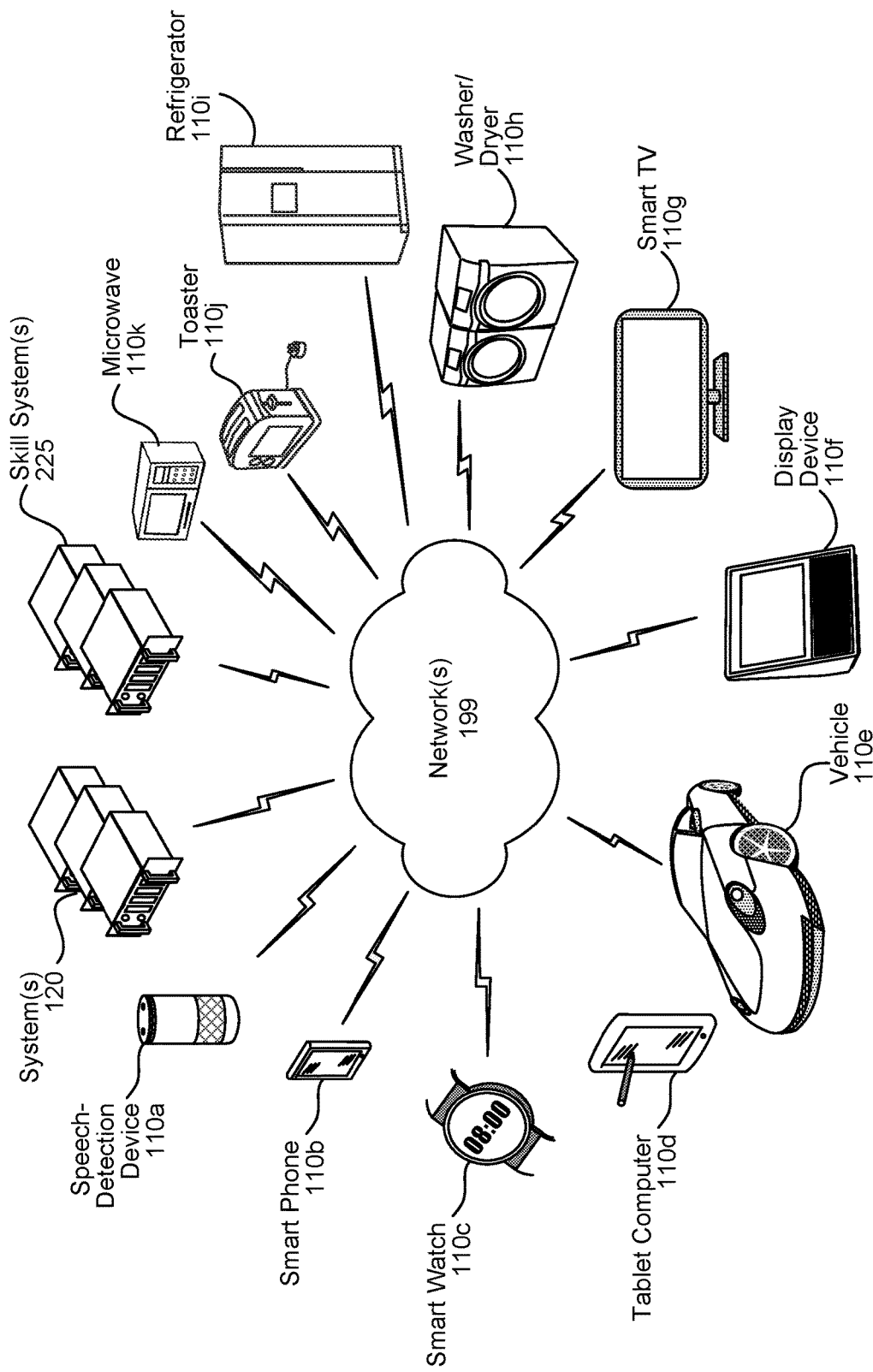
FIG. 12 illustrates an example of a computer network for use with the speech processing system.

As illustrated in FIG. 12, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. The components and process steps described herein may be interchangeable with other components or steps, or combinations of components or steps, and still achieve the benefits and advantages of the present disclosure. Moreover the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating dialog data corresponding to a multi-turn exchange between a system and a user, the method comprising:
receiving a first trained model configured to:
process first data representing an input of the multi-turn exchange, and
output second data including text data representing a system response corresponding to the input;
receiving a second trained model configured to:
process the second data, and
output third data representing a simulated user input to the multi-turn exchange, wherein the third data represents an entity; and
generating first dialog data comprising:
receiving dialog template data representing a sample multi-turn exchange, the dialog template data representing an example user input and an example system response,
determining that the dialog template data indicates a first application programming interface (API) of a plurality of APIs,
parsing the dialog template data to generate API-to-entity data, the API-to-entity data representing a first entity,
determining that the dialog template data indicates a second API of the plurality of APIs,
determining that the first API uses the first entity, that the first entity corresponds to an API parameter and that the API parameter corresponds to a time,
determining that the second API uses a second entity,
processing, using the second trained model, a portion of the dialog template data to determine first text data representing the simulated user input,
determining, using the first trained model, that the first text data lacks data corresponding to the first entity or the second entity,
generating, using the first trained model, second text data corresponding to a first prompt for the first entity,
generating, using the second trained model and the second text data, third text data indicating a first value for the first entity,
determining, using the first trained model and the third text data, a first request to the first API, the first request using the first value,
generating, using the first trained model, fourth text data corresponding to a second prompt for the second entity,
generating, using the second trained model and the fourth text data, fifth text data corresponding to a second value for the second entity, and
determining, using the first trained model and the fifth text data, a second request to the second API using the second entity, the second request using the second value.

2. The computer-implemented method of claim 1, further comprising:
determining that a third API corresponds to the second API;
generating, using the first trained model, sixth text data corresponding to a fourth request corresponding to the third API;
generating, using the second trained model, seventh text data corresponding to a the sixth text data; and
generating second dialog data based at least in part on the sixth text data and the seventh text data, the second dialog data corresponding to a third request to the third API.

3. The computer-implemented method of claim 2, further comprising:
determining a first state corresponding to the first API;
determining a second state corresponding to the second API;
determining a first output corresponding to the first API;
determining a first input corresponding to the second API;
determining that at least a first portion of the first output includes at least a second portion of the first input; and
based at least in part on determining that at least the first portion of the first output includes at least the second portion of the first input, transitioning from the first state to the second state.

4. The computer-implemented method of claim 1, wherein the first dialog data further comprises:
fourth data representing a first multi-turn exchange between the first trained model and the second trained model in which the second text data and the third text data are exchanged before the fourth text data and the fifth text data; and
fifth data representing a second dialog between the first trained model and the second trained model in which the fourth text data and the fifth text data are exchanged before the second text data and the third text data.

5. A computer-implemented method comprising:
receiving a first model trained to generate first data representing a prompt for information;
receiving a second model trained to generate second data representing a simulated user response to the prompt;
receiving dialog template data representing a sample multi-turn exchange between a system and a user;
determining that the dialog template data corresponds to a first function of an application programming interface (API);
parsing the dialog template data to generate API-to-entity data, the API-to-entity data representing a first entity;
determining that the API uses an API parameter corresponding to the first function, wherein a value that corresponds to the API parameter is required to make an API call corresponding to the first function;
determining a second entity corresponding to a second function; and
generating first dialog data by:
selecting, using the second model, a first request corresponding to the first function,
determining, using the first model, that the first request represents the first entity,
determining, using the first model, a second request for the second entity,
determining, using the second model, a third request corresponding to the second function, and
determining, using the first model, that the third request represents the second entity.

6. The computer-implemented method of claim 5, further comprising:
determining, using the first model, that the second function requires the second entity; and
determining, using the first model a fourth request to execute the second function using the second entity, wherein the first dialog data includes the fourth request.

7. The computer-implemented method of claim 5, further comprising:
 determining, using the first model, a third entity corresponding to a third function;
 determining, using the first model, a fourth request for the third entity; and
 determining, using the first request, second request, third request, and fourth request, second dialog data corresponding to the third function.

8. The computer-implemented method of claim 7, wherein determining the fourth request further comprises:
 determining, using the first model, a first score corresponding to a fifth request, the fifth request corresponding to the first function; and
 determining, using the first model, a second score corresponding to the fourth request, the fourth request corresponding to the third function,
 wherein determining the second dialog data is based at least in part on the first score and the second score.

9. The computer-implemented method of claim 8, wherein determining the first score comprises at least one of:
 determining, using the first model, that the third entity corresponds to at least one of the first entity and second entity; or
 determining, using the first model, that the second function corresponds to the first dialog data.

10. The computer-implemented method of claim 5, further comprising:
 determining response data based at least in part on the dialog template data; and
 determining, using a natural-language component, the response data, and the first dialog data, third data representing a natural-language dialog.

11. The computer-implemented method of claim 5, further comprising:
 determining a third entity corresponding to the first function;
 sending, to a remote system, the third entity and the dialog template data;
 receiving, from the remote system, a fourth request corresponding to the first function;
 determining, using the first model, that the fourth request includes the third entity; and
 determining, using the first request, second request, third request, and fourth request, second dialog data corresponding to the first function.

12. The computer-implemented method of claim 5, further comprising:
 determining third data representing a first dialog in which the first request precedes the second request; and
 determining fourth data representing a second dialog in which the second request precedes the first request.

13. The computer-implemented method of claim 5, further comprising:
 selecting system output corresponding to the API parameter,
 wherein the dialog template data comprises API information corresponding to a goal and the first entity is required to make the API call, the API call corresponding to the goal.

14. The computer-implemented method of claim 5, wherein the API parameter is a first API parameter, and further comprising:
 determining system output corresponding to a second API parameter, the second API parameter corresponding to a second API call, the second API call corresponding to the second function,
 wherein the dialog template data comprises API information corresponding to a goal and the second entity is required to make the second API call, the second API call corresponding to the goal.

15. The computer-implemented method of claim 5, wherein the API is a first API and the API parameter is a first API parameter, and further comprising:
 determining, based on sample user input of the sample multi-turn exchange, that the first function of the API corresponds to a first API call that requires the first API parameter; and
 determining, based on the sample user input of the sample multi-turn exchange, that the second function is of a second API and corresponds to a second API call that requires a second API parameter,
 wherein the second entity corresponds to a second API parameter.

16. A system comprising:
 at least one processor; and
 and at least one memory including instructions that, when executed by the at least one processor, cause the system to:
 receive a first model trained to generate first data representing a prompt for information;
 receive a second model trained to generate second data corresponding to the information;
 generate dialog outline data for a goal-based interaction between a system and a user;
 determine that a first entity corresponding to an application programming interface (API) is represented in the dialog outline data;
 generate a first list indicating that the first entity of the API has been fulfilled;
 receive dialog template data representing a sample multi-turn exchange between the system and the user;
 determine that the dialog template data corresponds to a first function of the API;
 determine, that the first entity corresponds to an API parameter corresponding to the first function;
 determine a second entity corresponding to a second function; and
 generate first dialog data by causing the system to:
 select, using the second model, a first request corresponding to the first function,
 determine, using the first model, that the first request represents the first entity,
 determine, using the first model, a second request for the second entity,
 determine, using the second model, a third request corresponding to the second function, and
 determine, using the first model, that the third request represents the second entity.

17. The system of claim 16, wherein the at least one memory further includes instructions that, when executed by the at least one processor, further cause the system to:
 determine, using the first model, a third entity corresponding to a third function;
 determine, using the first model, a fourth request for the third entity; and
 determine, using the first request, second request, third request, and fourth request, second dialog data corresponding to the third function.

18. The system of claim 17, wherein the at least one memory further includes instructions that, when executed by the at least one processor, further cause the system to:

determine, using the first model, a first score corresponding to a fifth request, the fifth request corresponding to the first function; and determine, using the first model, a second score corresponding to the fourth request, the fourth request corresponding to the third function, wherein determining the second dialog data is based at least in part on the first score and the second score.

19. The system of claim 18, wherein the at least one memory further includes instructions that, when executed by the at least one processor, further cause the system to:

determine, using the first model, that the third entity corresponds to at least one of the first entity and second entity; and determine, using the first model, that the second function corresponds to the first dialog data.

20. The system of claim 16, wherein the at least one memory further includes instructions that, when executed by the at least one processor, further cause the system to:

determine, using the first model, that the second function requires the second entity; and determine, using the first model, a fourth request to execute the second function using the second entity, wherein the first dialog data includes the fourth request.

21. The system of claim 16, wherein the at least one memory further includes instructions that, when executed by the at least one processor, further cause the system to:

determine response data based at least in part on the dialog template data; and determine, using a natural-language component, the response data, and the first dialog data, third data representing a natural-language dialog.

22. The system of claim 16, wherein the at least one memory further includes instructions that, when executed by the at least one processor, further cause the system to:

determine a third entity corresponding to the first function;

send, to a remote system, the third entity and the dialog template data;

receive, from the remote system, a fourth request corresponding to the first function;

determine, using the first model, that the fourth request includes the third entity; and determine, using the first request, second request, third request, and fourth request, second dialog data corresponding to the first function.

23. The system of claim 16, wherein the at least one memory further includes instructions that, when executed by the at least one processor, further cause the system to:

determine third data representing a first dialog in which the first request precedes the second request; and determine fourth data representing a second dialog in which the second request precedes the first request.

* * * * *